(12) United States Patent
Ohtsu et al.

(10) Patent No.: US 6,316,647 B1
(45) Date of Patent: Nov. 13, 2001

(54) CATION-EXCHANGED CLAY MINERAL, PACKING MATERIAL FOR CHROMATOGRAPHY USING THE SAME AND METHOD OF PRODUCING THE SAME

(75) Inventors: Yutaka Ohtsu; Isao Tanaka; Yasuhiko Kadota; Michihiro Yamaguchi, all of Yokohama (JP)

(73) Assignee: Shiseido Company, Ltd., Tokyo (JP)

( * ) Notice: Subject to any disclaimer, the term of this patent is extended or adjusted under 35 U.S.C. 154(b) by 0 days.

(21) Appl. No.: 09/662,716

(22) Filed: Jan. 22, 1999

Related U.S. Application Data (6263) Continuation-in-part of application No. 08/867,386, filed on Jun. 2, 1997, now abandoned, which is a continuation of application No. 08/325,287, filed as application No. PCT/JP94/00311 on Feb. 25, 1994, now abandoned.

(30) Foreign Application Priority Data

Feb. 26, 1993 (JP) .......................................... 5-63217

(51) Int. Cl.$^7$ ........................................................ C11B 7/00
(52) U.S. Cl. ........................ 554/194; 554/191; 502/82; 502/55; 502/86; 210/198.2
(58) Field of Search ........................... 554/191, 194; 502/82, 85, 86; 210/198.2

(56) References Cited

U.S. PATENT DOCUMENTS 5,145,578 * 9/1992 Tokubo et al. ................... 210/198.2

OTHER PUBLICATIONS

Chem. abstr. vol. 114, No. 11, p. 241, Yamada et al "Preparation and properties of antibacterial clay interlayer compound", 1991.*

* cited by examiner

Primary Examiner—Deborah D. Carr
(74) Attorney, Agent, or Firm—Townsend & Banta

(57) ABSTRACT

Disclosed herein are a cation-exchanged clay mineral comprising a swelling clay mineral with the cations between layers substantially replaced by low-valence metal amine complexes and/or low-valence metal ammine complexes, and a packing material for chromatography using the same. Use of the packing material provides a sharp peak with respect to a highly unsaturated compound. Since the packing material is unlikely to be influenced by a solvent, it is usable for a long time with good stability.

17 Claims, 11 Drawing Sheets

CATION-EXCHANGED CLAY MINERAL, PACKING MATERIAL FOR CHROMATOGRAPHY USING THE SAME AND METHOD OF PRODUCING THE SAME

CROSS REFERENCE TO A RELATED APPLICATIONS

This is a Continuation-In-Part patent application of parent application Ser. No. 08/867,386 filed Jun. 2, 1997 now abandoned, which incorporates by reference this parent application, a continuation of application Ser. No. 08/325,287 filed Oct. 25, 1994, now abandoned, which is a 371 of PCT/JP94/00311 filed Feb. 25, 1994.

FIELD OF THE INVENTION

The present invention relates to a cation-exchanged clay mineral, a packing material for chromatography using the same and a method of producing the same. More particularly, the present invention relates to an improvement of an exchanging cation thereof.

BACKGROUND OF THE INVENTION

Chromatography is generally used for the analysis or separation and refinement of various substances. Liquid chromatography is divided largely into adsorption chromatography and partition chromatography according to the separation mechanism.

Partition chromatography is further divided into normal-phase partition chromatography and reversed-phase partition chromatography according to the polarities of the elute and the packing material.

Most of the packing materials used for adsorption chromatography and normal-phase partition chromatography are totally porous silica gel packing materials in which macropores and micropores are dispersed reticulately. Alternatively, inorganic supports such as alumina and porous glass materials, and porous polymers such as polystyrene-divinyl benzene, polyvinyl alcohol and polyhydroxy methacrylate are used. Calcium hydroxide powder, calcium phosphate gel, etc. are also used for specific purposes.

Above-described chromatographic supports (e.g., silica gel) modified with alkyl groups, such as octadecyl groups, are often used for reversed-phase chromatography.

Other packing materials are also used, for example, packing materials for cation-exchange liquid chromatography such as silica gel or a porous polymer with a compound having a sulfonyl group or carboxyl group combined therewith and packing materials for anion-exchange liquid chromatography such as silica gel or a porous golymer with a quaternary ammonium or a diethylamino group combined therewith.

All of these packing materials, however, suffer from various problems. Especially, the discrimination between saturation and unsaturation is so poor that the discrimination between substances having similar molecular weights is very difficult. An improvement at this point has therefore been in strong demand.

As a packing material for meeting such a demand, the present invention developed a packing material disclosed in Japanese Patent Laid-Open No. 199155/1989.

This packing material is a swelling clay mineral with the ions between layers substantially replaced by cations other than sodium ions, especially, silver ions. Since this packing material has discrimination between saturation and unsaturation, it is possible to separate a wide variety of unsaturated compounds into substances according to the degree of unsaturation. The packing material is therefore used as a means of analyzing and separating various compounds.

Even this packing material composed of the clay mineral, however, very strongly adsorbs a highly unsaturated compound having a degree of unsaturation of not less than 3, and the peak in chromatography becomes broad, which makes efficient and short-time analysis and separation impossible.

In addition, a poor reproducibility of retention time in certain solvents has been a big problem.

SUMMARY OF THE INVENTION

Accordingly, it is an object of the present invention to eliminate the above-described problems in the related art and to provide a packing material for chromatography which has a high resolution, especially, with respect to an unsaturated compound and an excellent time stability, and a cation-exchanged clay mineral can be used as the packing material.

As a result of studies undertaken by the present invention so as to achieve this aim, it has been found that the problem of a broad peak of a highly unsaturated compound and the problem of the poor reproducibility of retention time of an unsaturated compound can be solved when a low-valence metal existing between layers of a clay mineral is an ammine or amine complex. On the basis of this finding, the present invention has been achieved.

To state this concretely, it was found that the low-valence metal ions such as silver ions existing between layers of a clay mineral not only exist in the form of ions but also are oxidized or reduced when they come into contact with a solvent. In other words the existing state of the ions changes, and this is the main cause of a broad peak and a wide variety of the holding time of a highly unsaturated compound.

For example, it was confirmed as a result of X-ray analysis that the monovalent silver ions existing between layers of a clay mineral are oxidized into silver oxide at a high temperature, or by a solvent or reduced into metal silver.

It was also confirmed that the monovalent copper ions which are considered to show a discrimination between saturation and unsaturation in the same way as silver are easily oxidized into divalent copper ions when these are dried. The divalent copper ions do not separates unsaturated substances anymore.

The present inventors therefore paid attention to the existing form of the low-valence metal ions which exist between layers of a clay mineral.

In a first aspect of the present invention, there is provided a cation-exchanged clay mineral comprising a swelling clay mineral with spherical shape and the cations between layers substantially replaced by low-valence metal amine complexes and/or low-valence metal ammine complexes.

A packing material for chromatography provided in a second aspect of the present invention comprises a cation-exchanged clay mineral provided in the first aspect of the present invention.

A clay mineral provided in a third aspect of the present invention is characterized in that the low-valence metal amine complex is represented by the general formula: $[M(NH_3)_{1-3}]X$ (wherein M is a metal, and X is an anion).

In a clay mineral provided in a fourth aspect of the present invention, M is monovalent copper, silver or gold.

A vessel in a fifth aspect is characterized in that the packing material is said clay mineral. The vessel is preferably a column shape.

In a sixth aspect of the present invention, there is provided a method of producing a cation-exchanged clay mineral comprising the steps of immersing a swelling clay mineral in an ammonia alkali ammonium ion solution, drying the swelling clay mineral, and immersing the dried swelling clay mineral in a low-valence metal amine complex solution and/or a low-valence metal ammine complex solution so as to substantially replace the cations between layers by the low-valence metal amine complexes and/or the low-valence metal ammine complexes.

In a method of producing a cation-exchanged clay mineral provided in a seventh aspect of the present invention, the clay mineral immersed in the low-valence metal amine complex solution and/or the low-valence metal ammine complex solution is further heated.

In a eighth aspect of the present invention, there is provided a method of separating or collecting unsaturated compound by using a packing material obtained by substantially replacing the cations between layers of a swelling clay mineral by low-valence metal amine complexes and/or low-valence metal ammine complexes.

In a method of separating fish oil and fat provided in an ninth aspect of the present invention, a fatty acid ester obtained by hydrolyzing and further esterifying fish oil and fat is used as an object of separation of decosahexaenoic acid.

In a method of separating unsaturated compound provided in a tenth aspect of the present invention, a supercritical fluid is used as a solvent.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
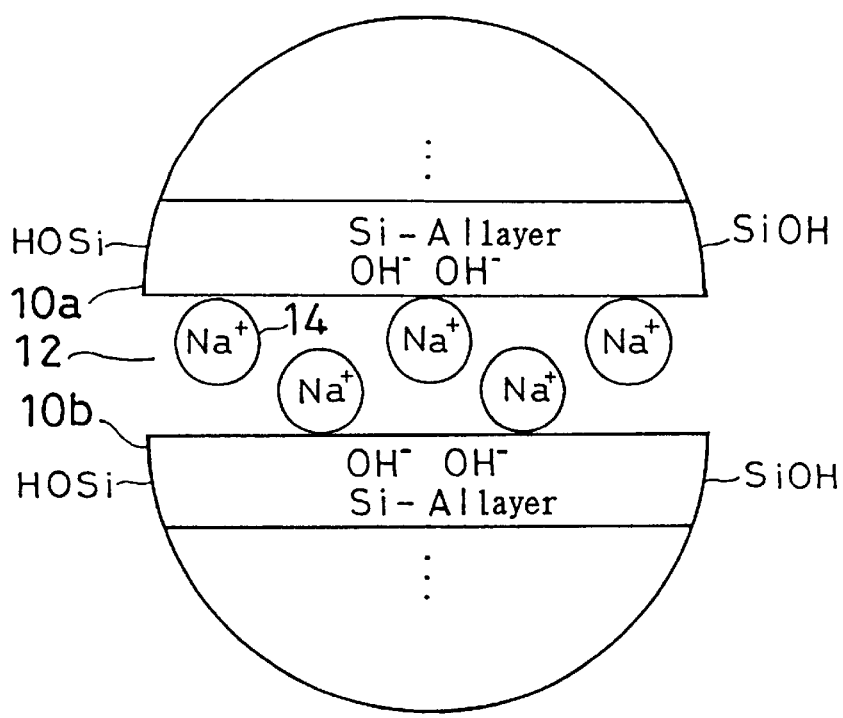
FIGS. 1, 2 and 3 are explanatory views of the process of producing a cation-exchanged clay mineral according to the present invention.

The structure of the present invention will be explained in more detail in the following.

A swelling clay mineral used in the present invention is a pyllosilicate mineral which belongs to a smectite group. Among smectites, montmorillonite, beidellite, nontronite, saponite and hectorite are preferably used. They may be either natural or synthetic. As a commercially available swelling clay mineral, Kunipia, SMECTON (produced by Kunimine corporation), Beegum (produced by Bunderbuit), Laponite (produced by Lapolte), Fluorine Tetrasilicon Mica (produced by Topy Industry, Ltd.), etc. are usable. In the present invention, at least one is selected from these swelling clay minerals. As a packing material for chromatography, a powder having a large specific surface area is suitable because it has a large adsorption capacity and it can strongly retain solute molecules. In addition, spherical clay mineral particles are more suitable for a packing material for chromatography than a clay mineral having an irregular shape because in the former, the pressure loss and the pressure fluctuation are small. From this point of view, Smecton, which is a synthetic saponite, and Laponite, which is a synthetic hectorite are especially suitable because by spray drying an aqueous gel thereof, it is possible to obtain spherical clay material particles.

As ammine complexes (ammonia complex salt) of a low-valence metal which replace the sodium ions existing between layers of the swelling clay mineral are usable ammine complexes of monovalent copper, silver and gold represented by the formula $[M(NH_3)_{1-3}]X$ (wherein M is a metal, and X is an anion). Although ammine complexes of divalent copper, mercury, platinum and palladium, are also usable, use of ammine complexes of monovalent copper, silver or gold is preferable.

The weight of these metal ammine complexes is about 60 to 150 milli-equivalents per 100 g of a clay mineral, but small amount of metal ammine complex such as 10 milli-equivalents can provide the clay mineral with a discrimination between saturation and unsaturation.

An ammine complex is prepared by dissolving one of the above-described monovalent or divalent metal salts (e.g., cuprous chloride and silver nitrate) in an appropriate amount of 25 to 28% ammonia water and stirring the mixture.

In the case of preparing an amine complex, an organic amine is preferably used in place of the ammonia water in the process of preparing an ammine complex.

As the organic amine, ethyl amine, ethylene diamine, diethylenetriamine, triethylenetramine, tetraethylenepentamine, monoethanolamine, etc, are usable.

These low-valence metal ammine complexes or amine complexes may be used singly or in the form of a mixture.

The metal ion content in the packing for chromatography in the present invention is different in metals, but it is 0.1 to 15 wt %, preferably 1 to 5 wt %.

When a cation-exchanged clay mineral of the present invention is produced, it is preferable that a material clay mineral is immersed in an ammonium ion solution in advance.

Figure 2:
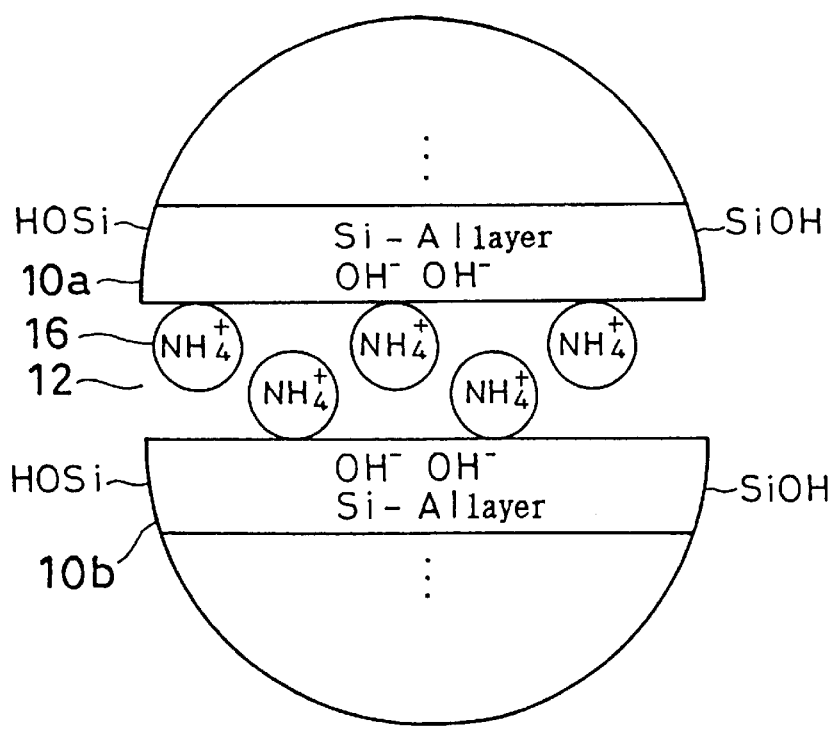
Figure 3:
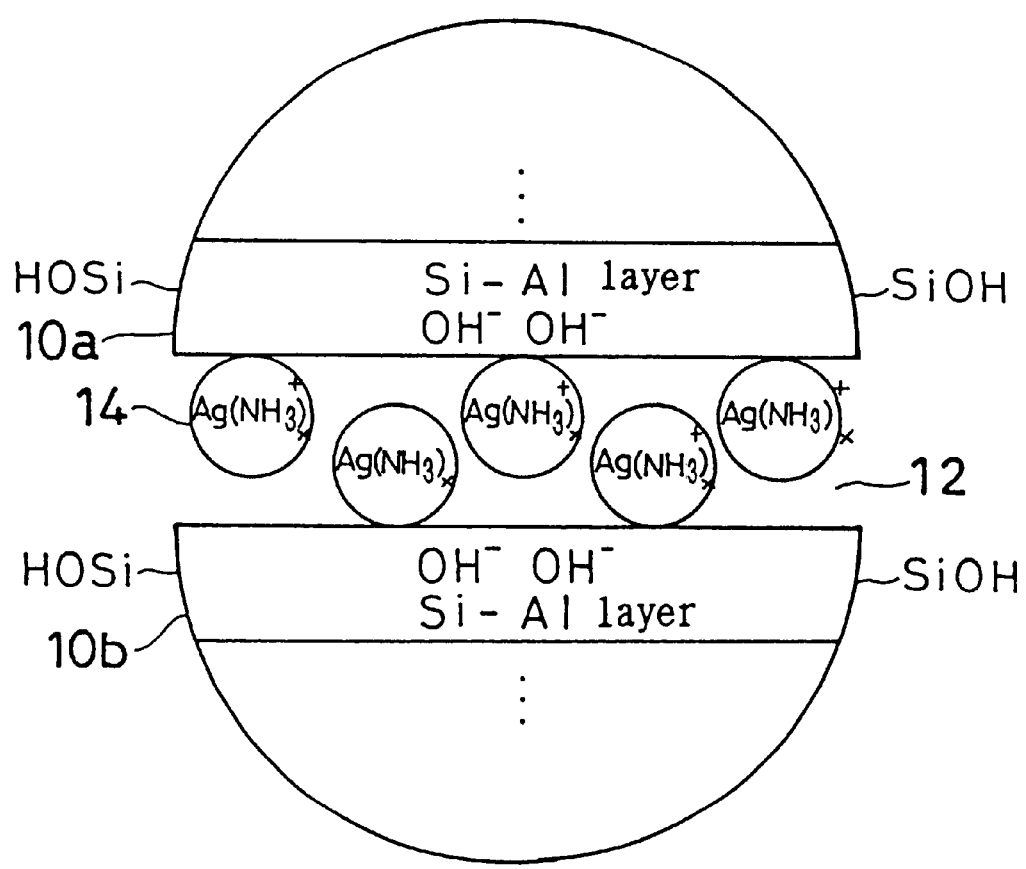

For example, montmorillonite has three-layered laminates. As shown in FIG. 1, in each three-layered laminate, sodium ions 14 are combined with an interlayer 12 between layers 10a and 10b. The sodium ions 14 in the interlayer 12 are first replaced by ammonium ions 16, as shown in FIG. 2, and the ammonium ions 16 are further replaced by low-valence metal complexes 18, as shown in FIG. 3.

In this manner, when the clay mineral is immersed in an ammonium ion solution so as to exchange the sodium ions in the clay mineral for the ammonium ions, the water-resistance is improved and some types of metal ammine complexes are more easily exchanged for the ammonium ions which have replaced the ions between layers of the metal clay in advance.

However, since cation exchange for ammine complexes or amine complexes is easy in some types of mineral clay even if they are not immersed in an ammonium ion solution, the step of immersing a clay mineral in an ammonium solution is not essential.

The concentration of the ammonium ions in a solution in which the clay mineral of the present invention is immersed is 0.1 to 10 N, preferably 0.5 to 3 N. The pH of the ammonium ion solution is adjusted to 7 to 12, preferably 8.5 to 10.5 by adding ammonia.

As the ammonia added, ammonia water is preferable, but ammonia gas is usable instead.

The clay mineral is preferably immersed in an ammonium solution for not less than 1 hour.

After immersion, the solvent is removed by filtration or the like, and dried at a temperature of now lower than 60° C., preferably 100 to 150° C. By drying the clay mineral in this way, the ammonia in the fine pores of the clay mineral is removed, thereby facilitating ion exchange for metal complex ions.

It is also preferable to heat the clay mineral after the cations exchanged for metal amine complexes or metal ammine complexes.

The heating temperature and the heating time are different in metals. The heating temperature which does not decompose metal ammine complexes or metal amine complexes is preferable. It is 80 to 500° C., more preferably 100 to 250° C. The heating time is 1 to 48 hours, preferably 4 to 18 hours. The higher the heating temperature and the longer the heating time, the stronger the holding power in chromatography and the easier the control over the retention time.

By heating the clay mineral in this manner, it is possible to enhance the activity of the silanol group exposed to the outer surface of the clay mineral, thereby further improving the function of the packing material.

The cation-exchanged clay mineral of the present invention is classified by an ordinary dry classification method and used as a packing material for chromatography.

The packing material of the present invention is usable as a packing material not only for liquid chromatography but also for supercritical chromatography or gas chromatography.

The present invention will be explained hereinunder in more detail with reference to preferred examples of the present invention. It is to be understood, however, that the present invention is not restricted thereto.

EXAMPLE 1

900 g of Laponite XLG was dispersed in 30 l of ion exchange water under stirring. The thus-obtained gel was spray dried by a disk spray dry testing machine while rotating the disk at 20000 rpm at an inlet temperature of about 200° C. and a discharge gas temperature of about 110° C., thereby obtaining 720 g of spherical clay mineral particles 2 to 20 $\mu$m in diameter. The spherical clay mineral particles were classified by a dry classifier TARBO CLASSIFINER TC-15N (produced by Nisshin Engineering) to obtain 180 g of a powder having a particle diameter of 3 to 8 $\mu$m.

30 g of the power was put into a 500 ml glass beaker, and 200 ml of 6% (W/V) ammonium nitrate/methanol solution and 0.66 ml of 28% ammonia water were added. After the mixture was stirred about 1 hour, it was filtered through a glass filter (G4). The filtrate was dried by a drier at 110° C. for 6 hours, and the dry powder obtained was put into a 500-ml beaker. Separately from this, 200 ml of methanol and 2.4 ml of 28% ammonia water were added to 2.55 g of silver nitrate to prepare a solution. The whole amount of solution was added to the powder in the beaker and the mixture was stirred for 16 hours. Thereafter, the mixture was filtered through a glass filter. The filtrate was washed with 200 ml of 28% ammonia water/methanol (1:100), and thereafter filtered. After the filtering and washing process was repeated three times, the filtrate was dried at 160° C. for 4 hours to obtain a packing material.

Above packing material was packed by a balanced-density technique into a stainless steel column having an inner diameter of 4.6 mm and a length of 250 mm. The packed column was connected to a high-speed chromatograph and 1% ethanol/hexane as a mobile phase was flowed at a rate of 1 ml/min. The temperature was set at 35° C. and a UV detector was used as a detector at a wavelength of 225 nm.

Figure 4:
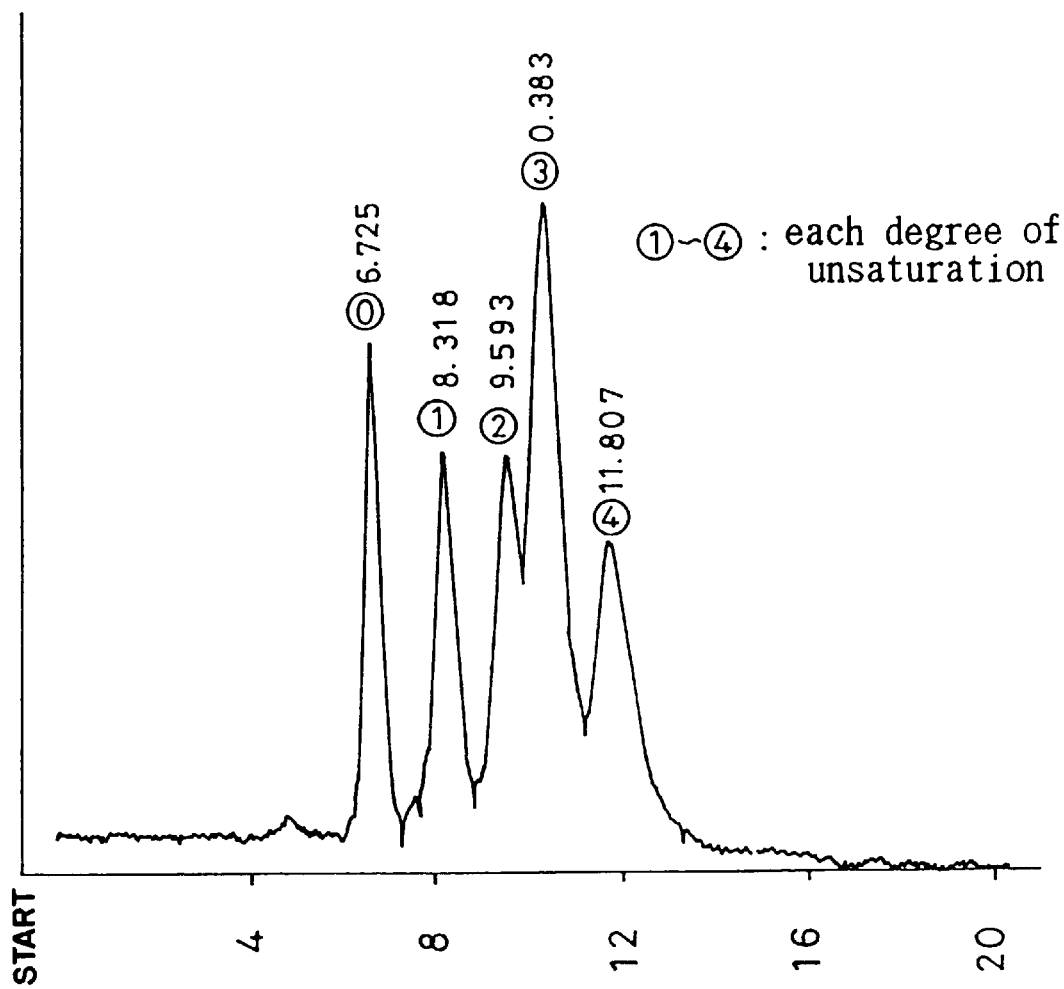
FIG. 4 is a chromatogram obtained by using the packing material in Example 1 of the present invention.

A mixture of fatty acid methyl esters having 20 carbon atoms and a degree of unsaturation of 0 to 4 was injected into the packed column as a sample. The chromatogram obtained is shown in FIG. 4. In the chromatogram, the substances were sharply separated and eluted in the ascending order of the degrees of unsaturation of 0 to 4.

COMPARATIVE EXAMPLE 4

Figure 5:
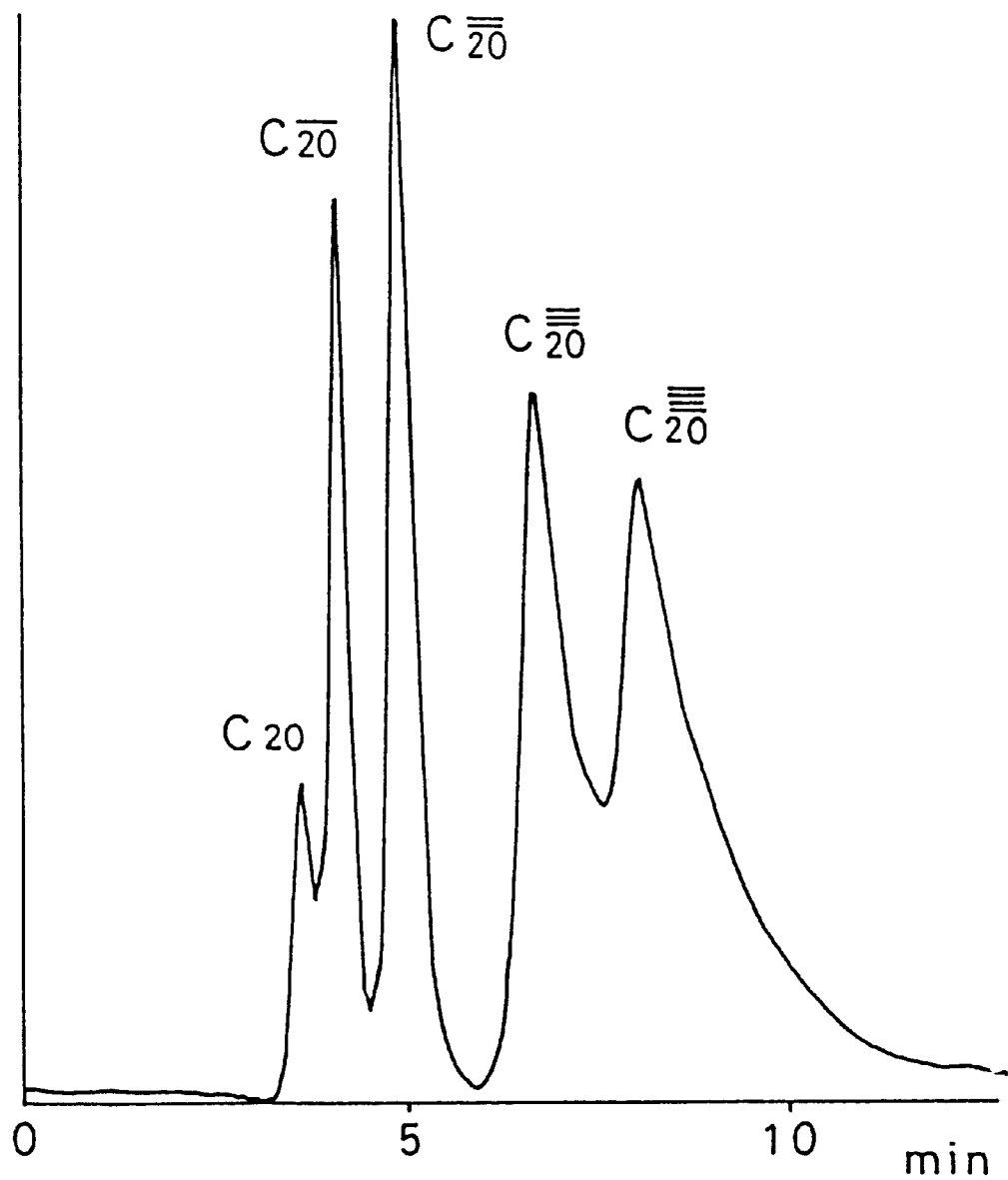
FIG. 5 is a chromatogram obtained by using the packing material in Comparative Example 1.

1.7 g of silver nitrate was dissolved in 1 l of ethanol, and 10 g of the classified spherical clay mineral particles obtained in Example 1 were dispersed in the solution. After the mixture was stirred for 4 hours, it was washed with methanol and dried at 80° C. to obtain a packing material. The packed column was connected to a high-speed liquid chromatograph and the same sample was injected into the column in the same way as in Example 1. The adsorption of the sample by the packing material was so strong that no elution of a fatty acid methyl ester was observed in the chromatogram. The solvent as the mobile phase was then replaced by acetone, which has a stronger elution power, and the detector was replaced by a differential refractometer. The chromatogram obtained is shown in FIG. 5. Five types of fatty acid methyl ester were separated and eluted, but the methyl esters having a degree of unsaturation of 3 to 4 showed a large tailing and separation was not good.

EXAMPLE 2

30 g of the classified spherical clay mineral particles obtained in Example 1 was charged into a 500-ml glass beaker, and 200 ml of 6% (W/V) ammonium nitrate/methanol solution and 1.0 ml of 28% ammonia water were added. After the mixture was stirred about 3 hours, it was filtered through a glass filter. The filtrate was dried by a drier at 110° C. for 6 hours, and the dry powder obtained was put into a 500-ml beaker. Separately from this, 400 ml of methanol and 5.0 ml of 28% ammonia water were added to 1.49 g of copper (I) chloride to prepare a solution. The whole amount of solution was added to the powder in the beaker and the mixture was stirred for 24 hours. Thereafter, the mixture was filtered through a glass filter. The filtrate was washed with 200 ml of 28% ammonia water/methanol (1:100), and thereafter filtered. After the filtering and washing process was repeated three times, the filtrate was dried at 110° C. for 16 hours to obtain a packing material. A stainless steel column having an inner diameter of 4.6 mm and a length of 250 mm was filled with the packing material.

The packed column was connected to a high-speed chromatograph and 0.5% acetonitrile/2% dioxane/hexane was used as a mobile phase at a flow rate of 0.5 ml/min. The temperature was set at 40° C. and a UV detector was used at a wavelength of 225 nm.

Figure 6:
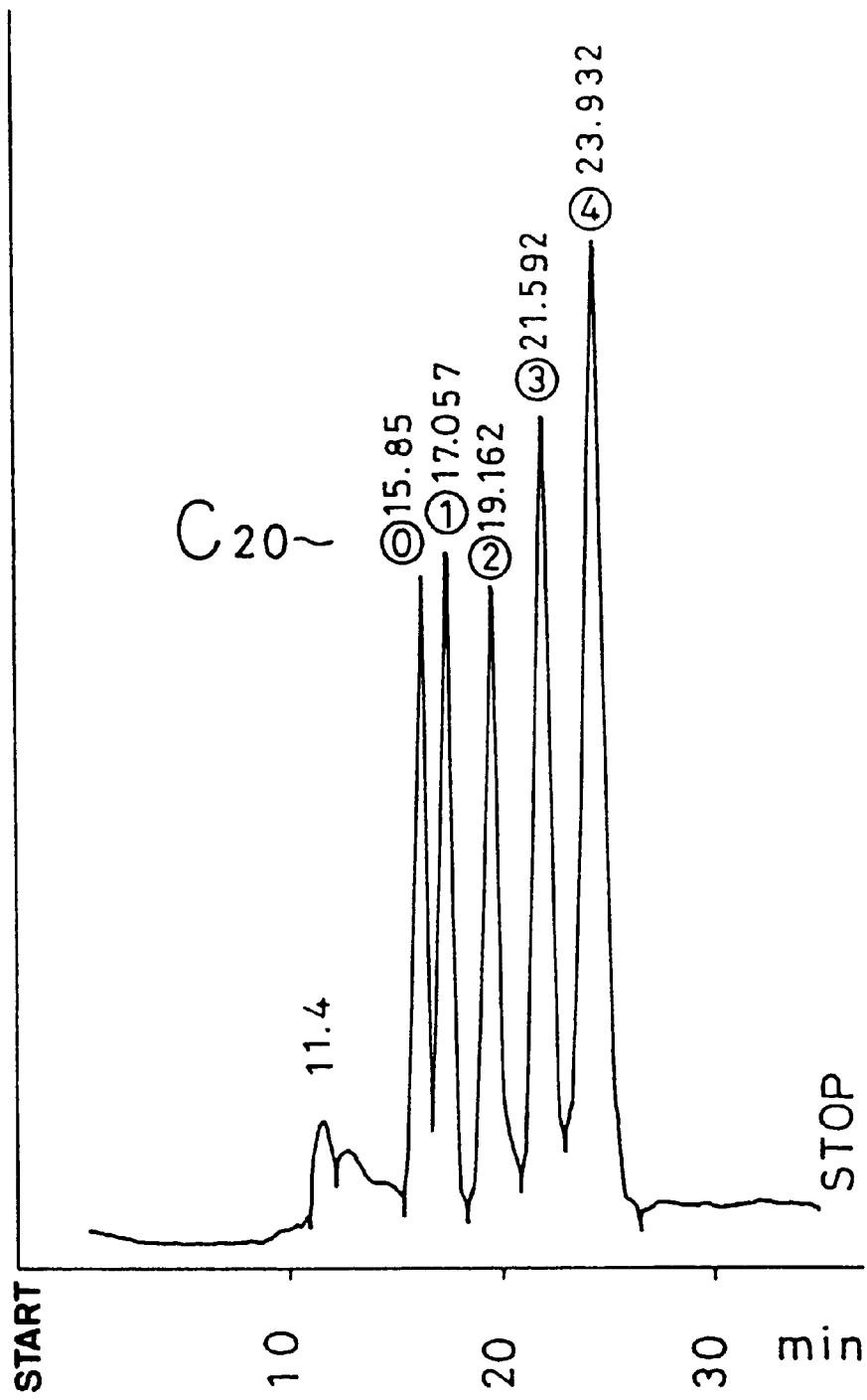
FIG. 6 is a chromatogram obtained when a mixture of fatty acid methyl esters having 20 carbon atoms and a degree of unsaturation of 0 to 4 was separated by using the packing material in Example 2.
Figure 7:
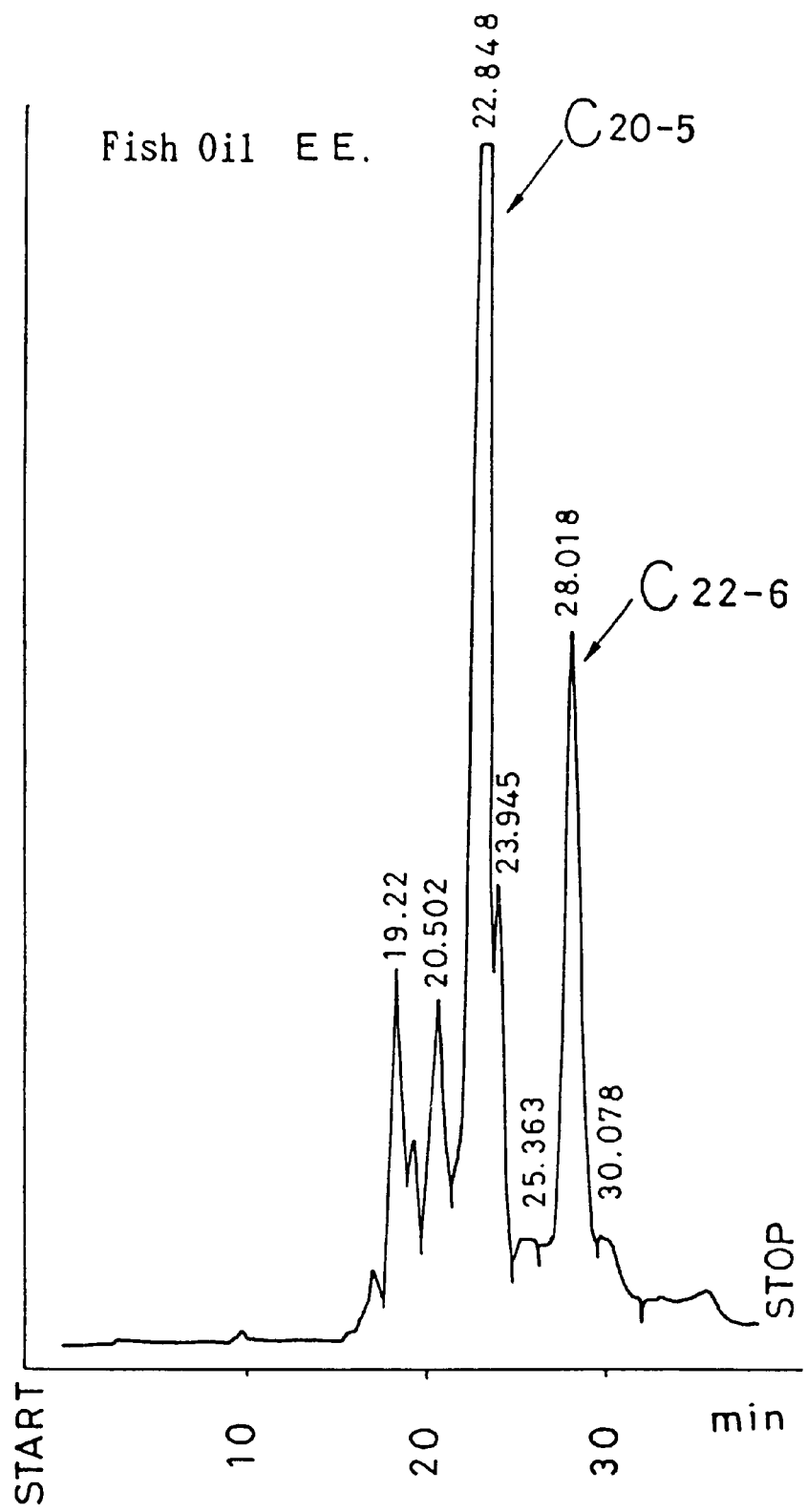
FIG. 7 is a chromatogram obtained when an ethyl ester of fish oil was separated by using the packing material in Example 2.

A mixture of fatty acid methyl esters having 20 carbon atoms and a degree of unsaturation of 1 to 4 and an ethyl ester of fish oil were injected into the packed column as samples. The chromatograms obtained are shown in FIGS. 6 and 7. The chromatogram of the mixture of fatty acid methyl esters shown in FIG. 6 has sharper peaks than that in Example 1, and any ingredient was separated out approximately completely. In the chromatogram of the ethyl ester of fish oil shown in FIG. 7, eicosapentaenoic ethyl ester having 20 carbon atoms and a degree of unsaturation of 5 and docosahexaenoic ethyl ester having 22 carbon atoms and a degree of saturation of 6, neither of which was eluted Comparative Example 1 were very sharply separated and eluted in 22.9 minutes and 28.0 minutes, respectively.

EXAMPLE 3

The classified spherical clay mineral particles obtained in Example 1 was subjected to ion exchange for silver ammine complexes, and thereafter dried at 110° C. for 16 hours to obtain a packing material. The packing material was heated to 250° C. for 4 hours. A stainless steel column having an inner diameter of 4.6 mm and a length of 250 mm was packed with the packing material. The packed column was connected to a supercritical fluid chromatograph (produced by Jasco corporation) and 10% (W/W) acetonitrile/carbon dioxide was used as a mobile phase at a flow rate of 1 ml/min in critical state of a pressure of 200 Kg and a temperature of 90° C. A UV detector was used at a wavelength of 225 nm.

Figure 8:
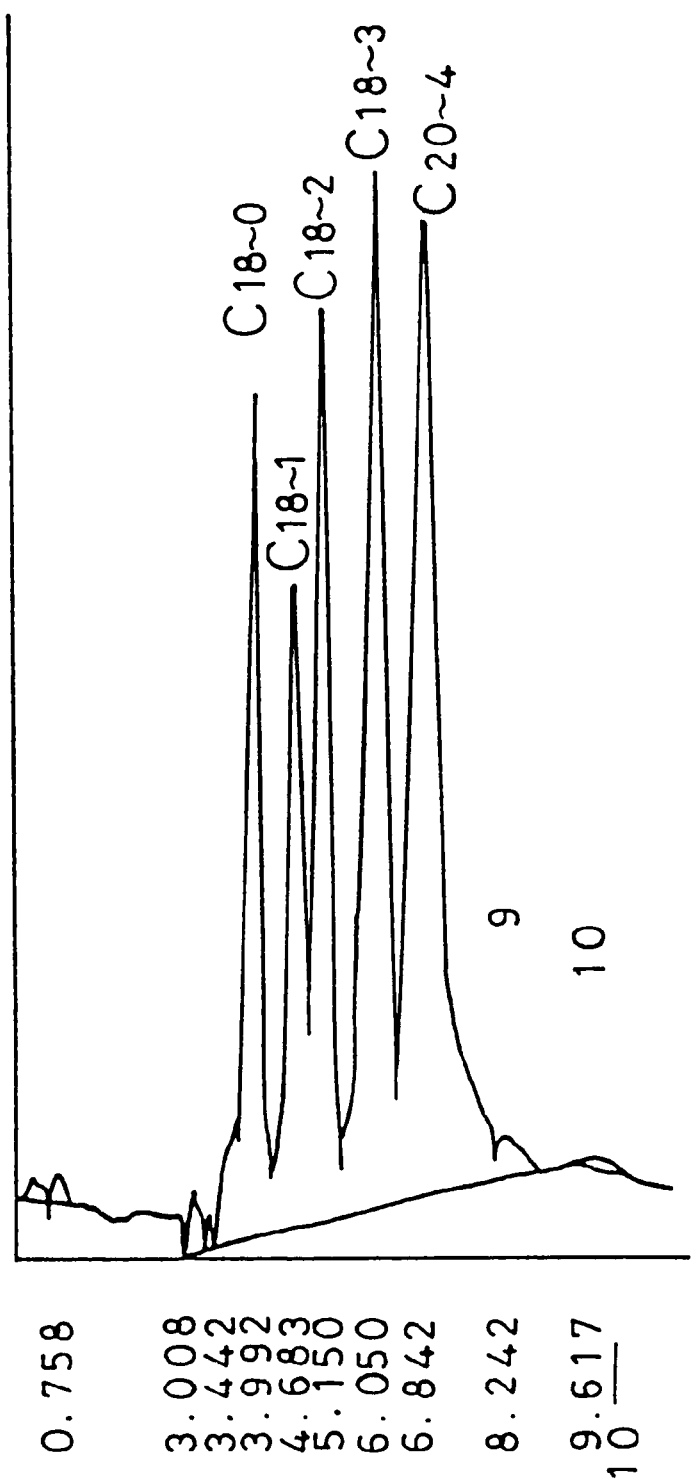
FIG. 8 is a chromatogram obtained by using the packing material in Example 3 of the present invention.

A mixture of fatty acid methyl esters having 18 carbon atoms and a degree of unsaturation of 0 to 3 and a fatty acid methyl ester having 20 carbon atoms and a degree of unsaturation of 4 was injected into the packed column as a sample. The chromatogram obtained is shown in FIG. 8. As is clear from FIG. 8, it was also possible to sharply separate and elute the ingredients according to the degree of saturation by supercritical chromatography using the packing material of the present invention.

EXAMPLE 4

A stainless steel column having an inner diameter of 20 mm and a length of 250 mm was packed with 100 g of the packing material produced in Example 1 by a balanced-density technique to obtain a packed column.

The packed column was connected to a supercritical fluid chromatograph (produced by Nihon Bunko) and separation and refinement with a carbon dioxide supercritical fluid was conducted under the conditions shown in Table 1. Fish oil and fat was hydrolyzed by an ordinary method to obtain a mixture of fatty acids composed of 3.3% of $C_{14:0}$, 16.9% of $C_{16:0}$, 5.2% of $C_{18:0}$, 16.3% of $C_{18:1}$, 12.2% of $C_{20:5}$, 30.0% of $C_{22:6}$ and the balance 14.3% (The former subscript in each C represents the number of carbons and the later subscript the number of carbon-carbon double bonds of the corresponding fatty acid. Therefore, $C_{20:5}$ represents EPA and $C_{22:6}$ DHA.) The mixture of fatty acids was then esterified by ethyl alcohol and used as a sample.

The packed column was equilibrated under the conditions for the step I in Table 1, and loaded with 2.72 g of the sample. The conditions were changed from the step I to the step II. Each fraction was separated at every 15 minutes, and after the solvent was distilled off, the yield and the purity of each fraction were obtained.

TABLE 1

|   | Pressure Kg/cm$^2$ | Temperature ° C. | CO$_2$ flow rate ml/min | Acetone flow rate ml/min | Fraction No |
|---|---|---|---|---|---|
| I | 200 | 50 | 8.5 | 1.5 | (1) to (10) |
| II | 200 | 50 | 6 | 4 | (11) to (17) |

Conditions were changed from step I to step II.
Each fraction was sampled at every 15 minutes.

The purity of each fraction was obtained from the area percentage of the gas chromatogram. From the fractions (11) to (17) at the step II, 0.59 g of DHA having a purity of 99.5% was obtained. (The recovery was 72.3%).

Figure 9:
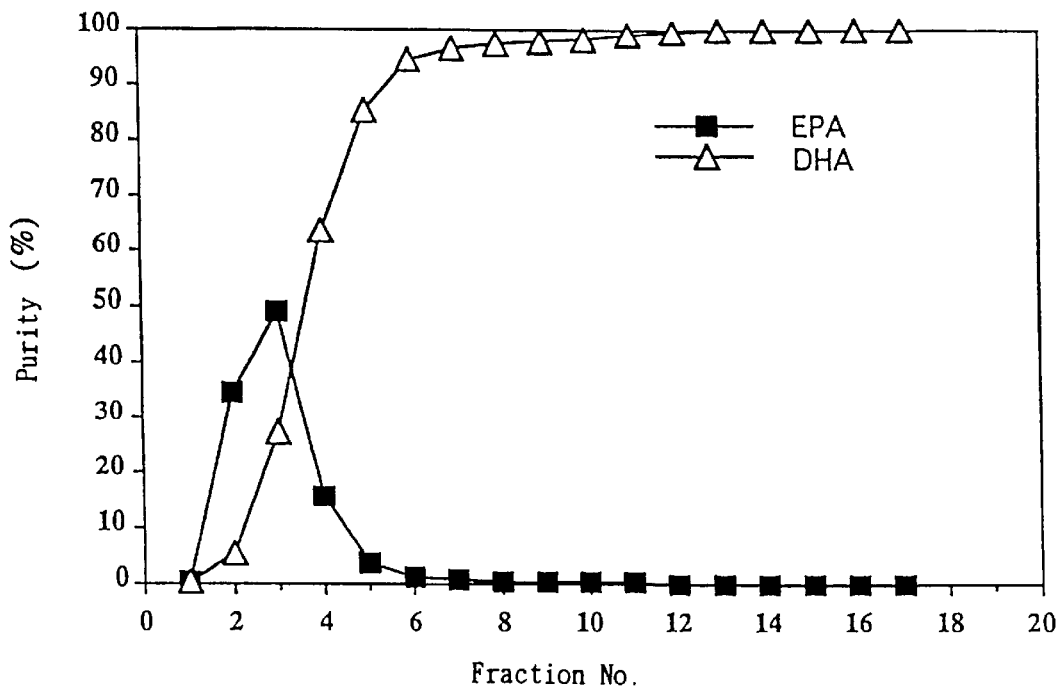
FIG. 9 is an explanatory view of the relationship between a fraction and the purity of each of EPA and DHA when the mixture of fatty acids ethyl esters prepared from fish oil and fat were separated and refined with a carbon dioxide supercritical fluid by using the packing material in Example 1.
Figure 10:
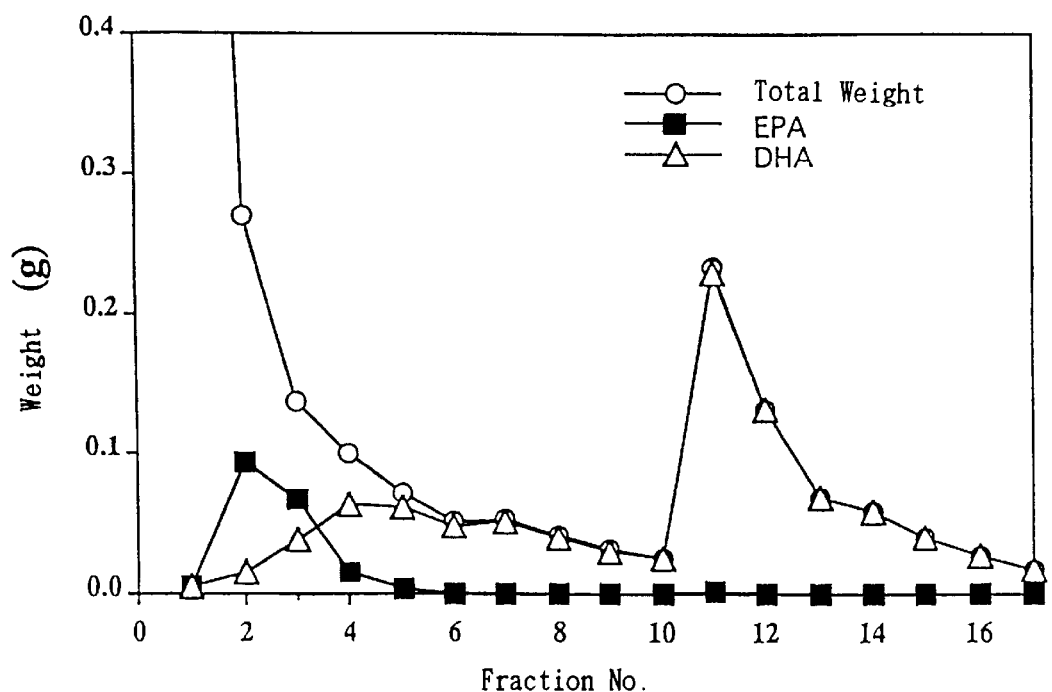
FIG. 10 is an explanatory view of the relationship between a fraction and the yield of each of EPA and DHA when the mixture of fatty acids ethyl esters prepared from fish oil and fat were separated and refined with a carbon dioxide supercritical fluid by using the packing material in Example 1.

FIG. 9 shows the purities of EPA and DHA in each fraction, and FIG. 10 shows the yield of each fraction and the weights of EPA and DHA. The weights of EPA and DHA were obtained from the purities thereof in each fraction and the yield of each fraction.

EXAMPLE 5

Separation and refinement was conducted in the same packed column as that in Example 1 with a carbon dioxide supercritical fluid under the conditions shown in Table 2. A mixture of fatty acid ethyl esters prepared from oil and fat containing 5.9% of γ-linolenic acid was used as a sample.

The mixture was composed of 0.8% of $C_{14:0}$, 27.6% of $C_{16:0}$ 6.5% of $C_{18:0}$, 42.6% of $C_{18:1}$, 8.9% of $C_{18:2}$, 5.9% of $C_{18:3}$ and the balance 6.4%.

The packed column was equilibrated under the conditions for the step I in Table 2, and loaded with 2.64 g of the sample. The conditions were changed in the order of steps I, II, III and IV. Each fraction was separated at every 15 minutes, and after the solvent was distilled off, each fraction was weighed and analyzed by gas chromatography.

TABLE 2

|  | Pressure Kg/cm$^2$ | Temperature °C. | CO$_2$ flow rate ml/min | Acetone flow rate ml/min | Fraction No |
| --- | --- | --- | --- | --- | --- |
| I | 200 | 50 | 9.5 | 0.5 | (1) to (10) |
| II | 200 | 50 | 9.4 | 0.6 | (11) |
| III | 200 | 50 | 9.3 | 0.7 | (12) |
| IV | 200 | 50 | 9.2 | 0.8 | (13) |
| V | 200 | 50 | 9.1 | 0.9 | (14) |
| VI | 200 | 50 | 9.0 | 1.0 | (15) |
| VII | 200 | 50 | 8.9 | 1.1 | (16) |
| VIII | 200 | 50 | 8.8 | 1.2 | (17) |
| IX | 200 | 50 | 8.7 | 1.3 | (18) |
| X | 200 | 50 | 8.5 | 1.5 | (19) |
| XI | 200 | 50 | 6.0 | 4.0 | (20) |

The purity of each fraction was obtained from the area percentage of the gas chromatogram. From the fractions (17), (18), (19) and (20) at the steps IX, X and XI, a γ-linolenic ethyl ester having a purity of not less than 75% was obtained.

Table 3 shows the purities, yields and recoveries of γ-linolenic ethyl ester in the main fractions.

TABLE 3

| Fraction No. | Purity (%) | Yield (g) | Recovery (%) |
| --- | --- | --- | --- |
| (17) to (20) | 76.2 | 0.153 | 74.8 |
| (18) to (20) | 77.2 | 0.125 | 61.7 |
| (19), (20) | 77.5 | 0.099 | 49.3 |
| (20) | 77.9 | 0.076 | 37.9 |

Figure 11:
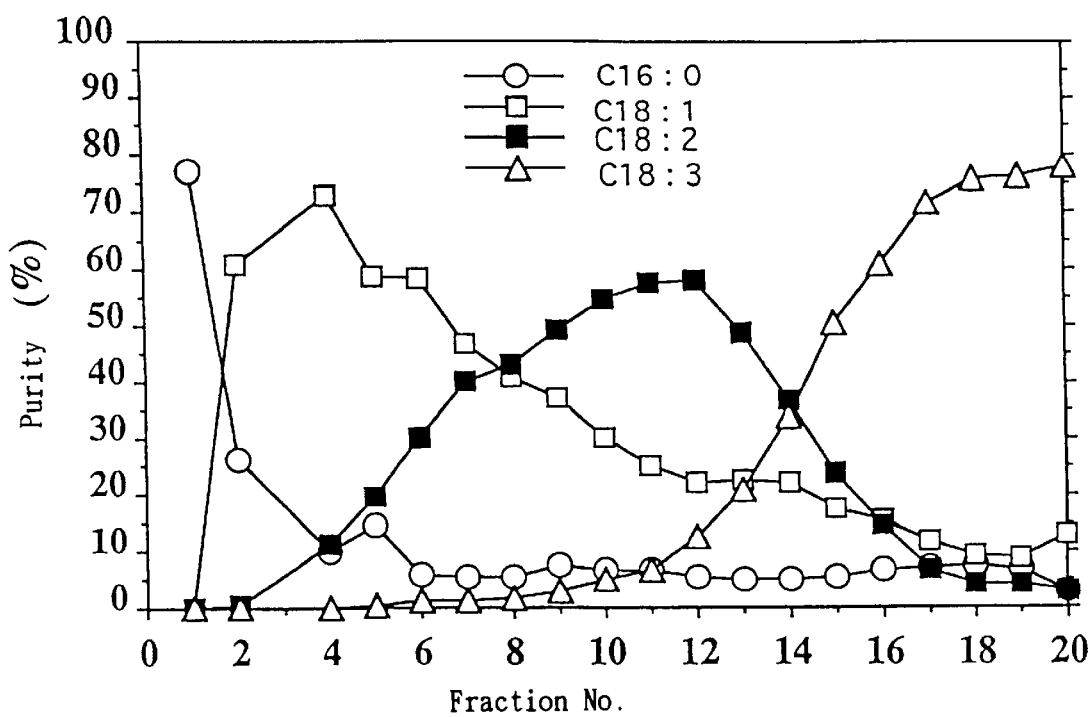
FIG. 11 is an explanatory view of the relationship between a fraction and the purity of each fatty acid when the mixture of oil and fatty acid containing γ-linolenic acid was separated and refined with a carbon dioxide supercritical fluid by using the packing material in Example 1.
Figure 12:
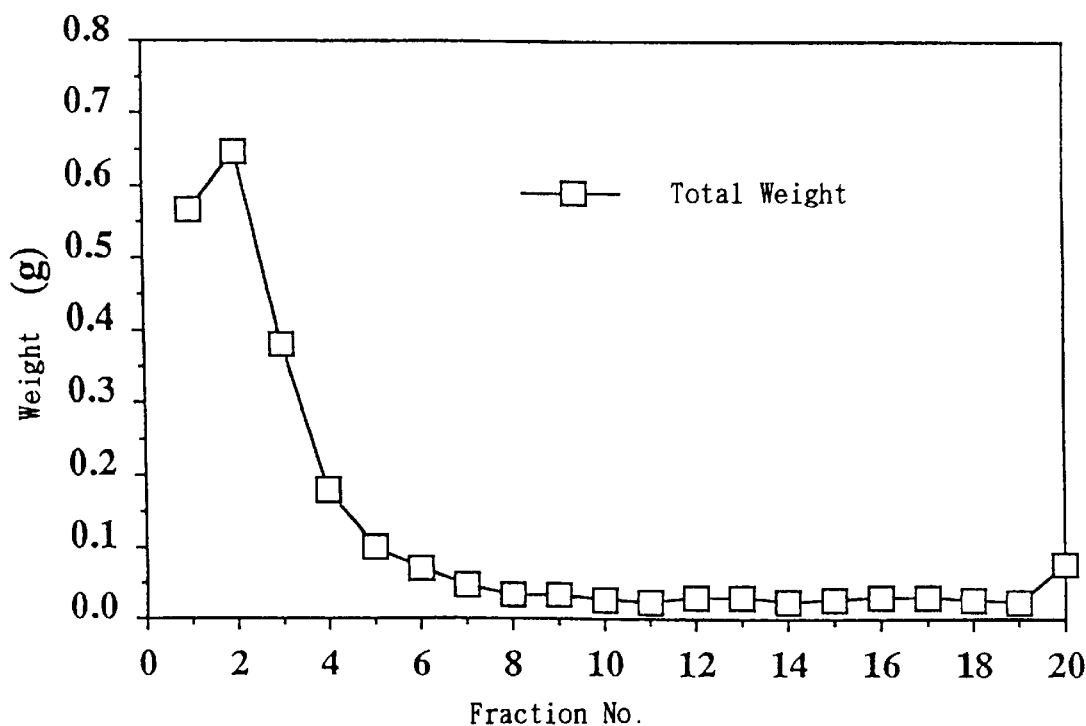
FIG. 12 shows the yield of each fraction when the mixture of fatty acid ethyl esters containing γ-linolenic ethyl ester acid was separated and refined with a carbon dioxide supercritical fluid by using the packing material in Example 1.

FIG. 11 shows the purities of $C_{16:0}$, $C_{18:1}$, $C_{18:2}$ and $C_{18:3}$ in each fraction. FIG. 12 shows the yield of each fraction.

EXAMPLE 6

The column produced in Example 4 was connected to a liquid chromatograph (Shimazu Seisakusho Ltd.) and separation and refinement was conducted under the conditions shown in Table 4. The same sample as that in Example 4 was used.

The packed column was equilibrated under the conditions for the step I in Table 4, and loaded with 2.58 g of the sample. The conditions were changed in the order of steps I, II, III and IV. Each fraction was separated at every 10 minutes, and after the solvent was distilled off, the yield and the purity of each fraction were obtained.

TABLE 4

|  | Temperature °C. | Hexane flow rate ml/min | Acetone flow rate ml/min | Fraction No |
| --- | --- | --- | --- | --- |
| I | RT | 10 | 0 | (1) to (6) |
| II | RT | 9.9 | 0.1 | (7) to (11) |
| III | RT | 9.5 | 0.5 | (12) to (16) |
| IV | RT | 6 | 4 | (17) to (20) |

The purity of each fraction was obtained from the area percentage of the gas chromatogram. From the fractions (14) and (19) at the step IV, 0.35 g of DHA having a purity of 99.1% was obtained. (The recovery was 45.2%.)

Figure 13:
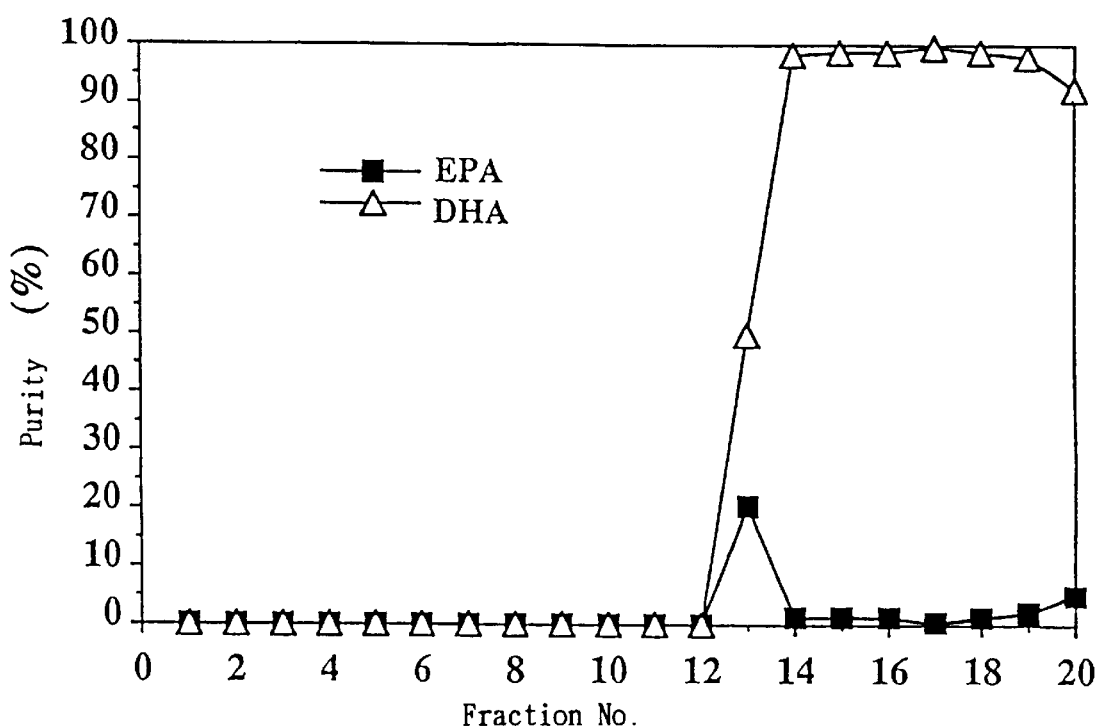
FIG. 13 is an explanatory view of the relationship between a fraction and the purity of each of EPA and DHA when the mixture of fatty acids ester prepared form fish oil and fat were separated and refined by liquid chromatography using the packing material in Example 1.
Figure 14:
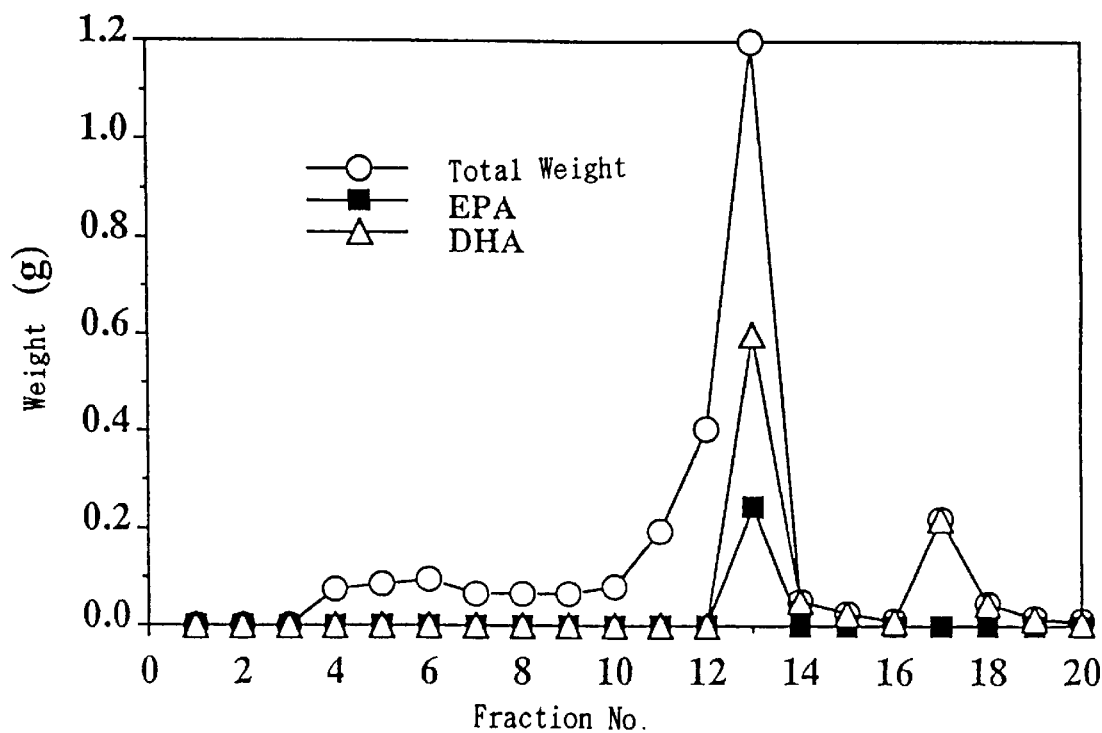
FIG. 14 is an explanatory view of the relationship between a fraction and the yield of each of EPA and DHA when the mixture of fatty acids of fish oil and fat were separated and refined liquid chromatography using the packing material in Example 1.

FIG. 13 shows the purities of EPA and DHA in each fraction, and FIG. 14 shows the yield of each fraction and the weights of EPA and DHA.

EXAMPLE 7

Purification of DHA-containing triglyceride was conducted with a carbon dioxide supercritical fluid by using the same apparatus as that in Example 4. The fish oil and fat before esterification used in Example 4 was used as a sample.

The packed column was equilibrated under the conditions for the step I in Table 5, and loaded with 2.70 g of the sample. The conditions were changed in the order of step I, II, III and IV. Each fraction was separated at every 15 minutes, and after the solvent was distilled off, each fraction was weighed and analyzed by gas chromatography. Before the gas chromatography, the sample was esterified by an ordinary method.

The purity of each fraction was obtained from the area percentage of the gas chromatogram. From the fractions (9) to (14) at the steps III and IV, triglyceride containing about 40% of DHA as the structural fatty acid was obtained. Table 6 shows the purity, the yield and the recovery of DHA in the fractions 9 to 14.

Figure 15:
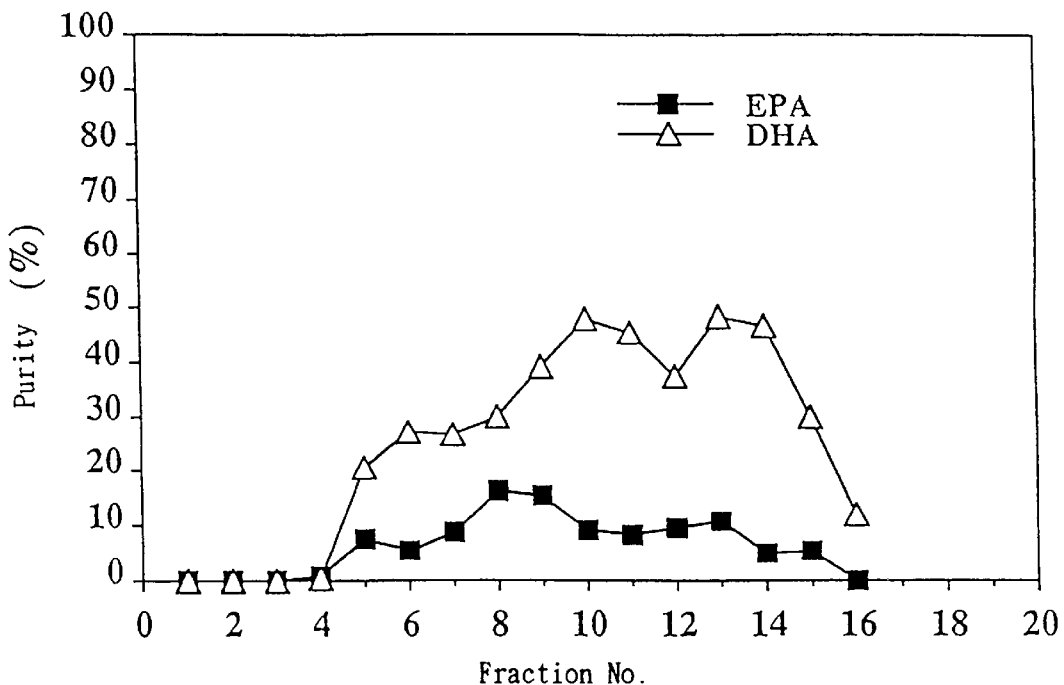
FIG. 15 is an explanatory view of the relationship between a fraction and the purity of each of EPA and DHA when DHA-containing triglyceride was separated and refined by liquid chromatography using the packing material in Example 1.
Figure 16:
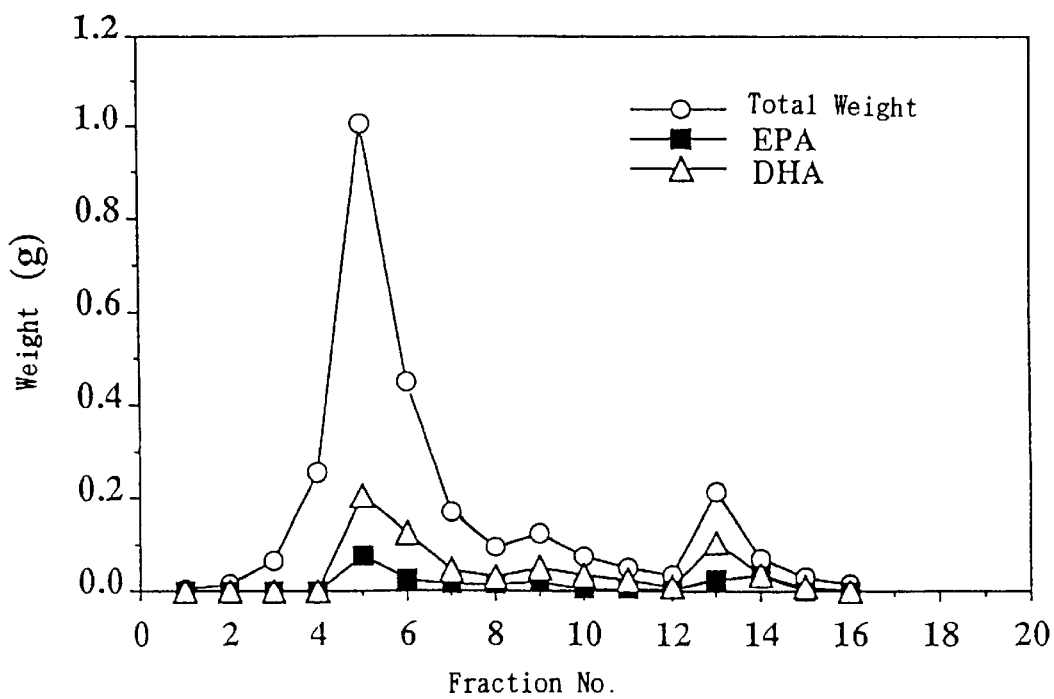
FIG. 16 is an explanatory view of the relationship between a fraction and the yield of each of EPA and DHA when DHA-containing triglyceride were separated and refined liquid chromatography using the packing material in Example 1.

FIG. 15 shows the purities of EPA and DHA in each fraction, and FIG. 16 shows the yield of each fraction and the yields of EPA and DHA in each fraction.

TABLE 5

|  | Pressure Kg/cm$^2$ | Temperature °C. | CO$_2$ flow rate ml/min | Acetone flow rate ml/min | Fraction No |
| --- | --- | --- | --- | --- | --- |
| I | 200 | 50 | 9 | 1 | (1) to (4) |
| II | 200 | 50 | 8.5 | 1.5 | (5) to (S) |
| III | 200 | 50 | 8 | 2 | (9) to (12) |
| IV | 200 | 50 | 6 | 4 | (13) to (16) |

TABLE 6

| Fraction No. | Purity (%) | Yield (g) | Recovery (%) |
| --- | --- | --- | --- |
| (9) to (14) | 45.23 | 0.26 | 39.95 |

As described above, the cation-exchanged clay mineral of the present invention which is used as a packing material for chromatography provides excellent resolution and time stability.

While there has been described what are at present considered to be preferred embodiments, of the invention, it will be understood that various modifications may be made thereto, and it is intended that the appended claims cover all such modifications as fall within the true spirit and scope of the invention.

What is claimed is:

1. A method for separation and collection of an unsaturated compound from a sample comprising the steps of:
    filling a chromatographic column with a packing material obtained by substantially replacing the cations between layers of a swelling clay mineral by low-valence metal amine complexes and/or low-valence metal ammine complexes to form a packed column;
    connecting the packed column to a chromatograph;
    injecting a sample containing the unsaturated compound into the packed column; and separating, eluting and collecting the unsaturated compound using the packed column containing the packing material.

2. A method for separation and collection of an unsaturated compound from a sample according to claim 1, wherein the sample contains a fatty acid ester obtained by hydrolyzing and further esterifying oil and fat which is used to separate and collect docosahexaenoic acid.

3. A method for separation and collection of an unsaturated compound from a sample according to claim 1, wherein the esters or acid are further refined using a supercritical fluid.

4. A method for separation and collection of an unsaturated compound from a sample according to claim 1, wherein a supercritical fluid is used as a solvent in separating the unsaturated compound.

5. A cation-exchanged clay mineral comprising:
a swelling clay mineral with spherical shape and cations between layers substantially replaced by low-valence metal amine complexes and/or low-valence metal ammine complexes.

6. A cation-exchanged clay mineral according to claim 5, wherein said low-valence metal ammine complex is represented by the general formula:

$$[M(NH_3)_{1-3}]X$$

wherein M is a metal, and X is an anion.

7. A packing material for chromatography comprising:
a swelling clay mineral with cations between layers substantially replaced by low-valence metal amine complexes and/or low-valence metal ammine complexes.

8. A packing material for chromatography according to claim 7, wherein said low-valence metal ammine complex is represented by the general formula:

$$[M(NH_3)_{1-3}]X$$

wherein M is a metal, and X is an anion.

9. A packing material for chromatography according to claim 8, wherein M in said general formula is one selected from the group consisting of monovalent copper, silver and gold.

10. A chromatographic column containing a cation-exchanged clay mineral, wherein said cation-exchanged clay mineral comprises a swelling clay mineral with cations between layers substantially replaced by low-valence metal amine complexes and/or low valence metal ammine complexes.

11. A chromatographic column according to claim 10, wherein said low-valence metal ammine complex is represented by the general formula:

$$[M(NH_3)_{1-3}]X$$

wherein M is a metal, and X is an anion.

12. A cation-exchanged clay mineral packing material for use in chromatography comprising a swelling clay mineral with cations between layers substantially replaced by low-valence metal amine complexes and/or low-valence metal ammine complexes.

13. The cation-exchanged clay mineral packing material for use in chromatography of claim 12, in which said low-valence metal ammine complex is represented by the general formula:

$$[M(NH_3)_{1-3}]X$$

wherein M is a metal, and X is an anion.

14. A method of producing a cation-exchanged clay mineral comprising the steps of:
immersing a swelling clay mineral in an ammonium ion solution;
drying said swelling clay mineral;
and immersing the dries swelling clay mineral in a low-valence metal amine complex solution and/or a low-valence metal amine complex solution so as to substantially replace the cations between layers by said low-valence metal amine complexes and/or said low-valence metal amine complexes.

15. A method of producing a cation-exchanged clay mineral according to claim 14, further comprising the step of heating said clay mineral immersed in said low-valence metal amine complex solution and/or said low-valence metal ammine complex solution.

16. A cation-exchanged clay mineral used as a packing material for chromatography comprising a spherically shaped swelling clay mineral having cations between layers substantially replaced by low-valence metal amine complexes and/or low-valence metal ammine complexes,
said low-valence metal ammine complex being represented by the general formula:

$$[M(NH_3)_{1-3}]X$$

wherein M is a metal, and X is an anion.

17. The cation-exchanged clay mineral used as a packing material for chromatography of claim 16, wherein said metal M is selected from the group consisting of monovalent copper, silver and gold.

* * * * *